United States Patent Office 2,992,293
Patented July 11, 1961

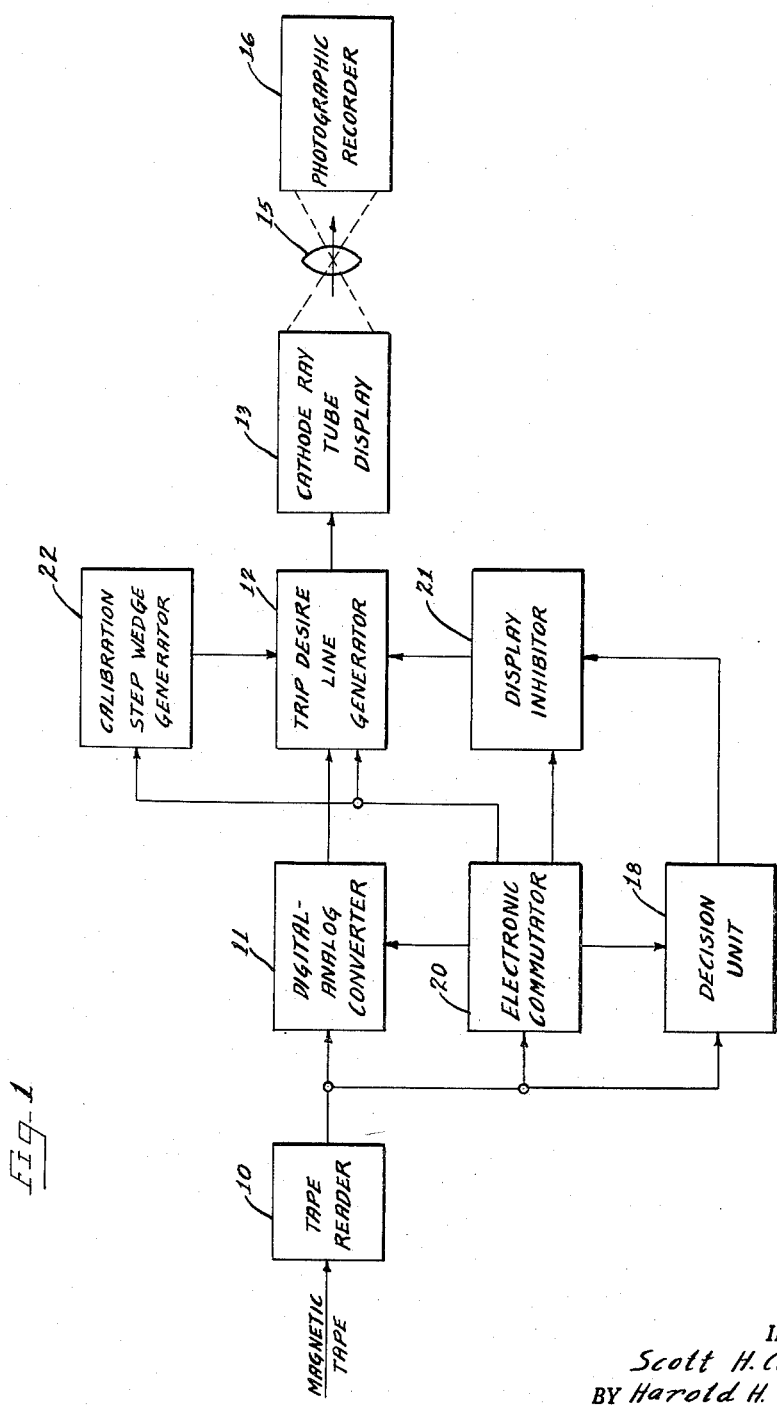

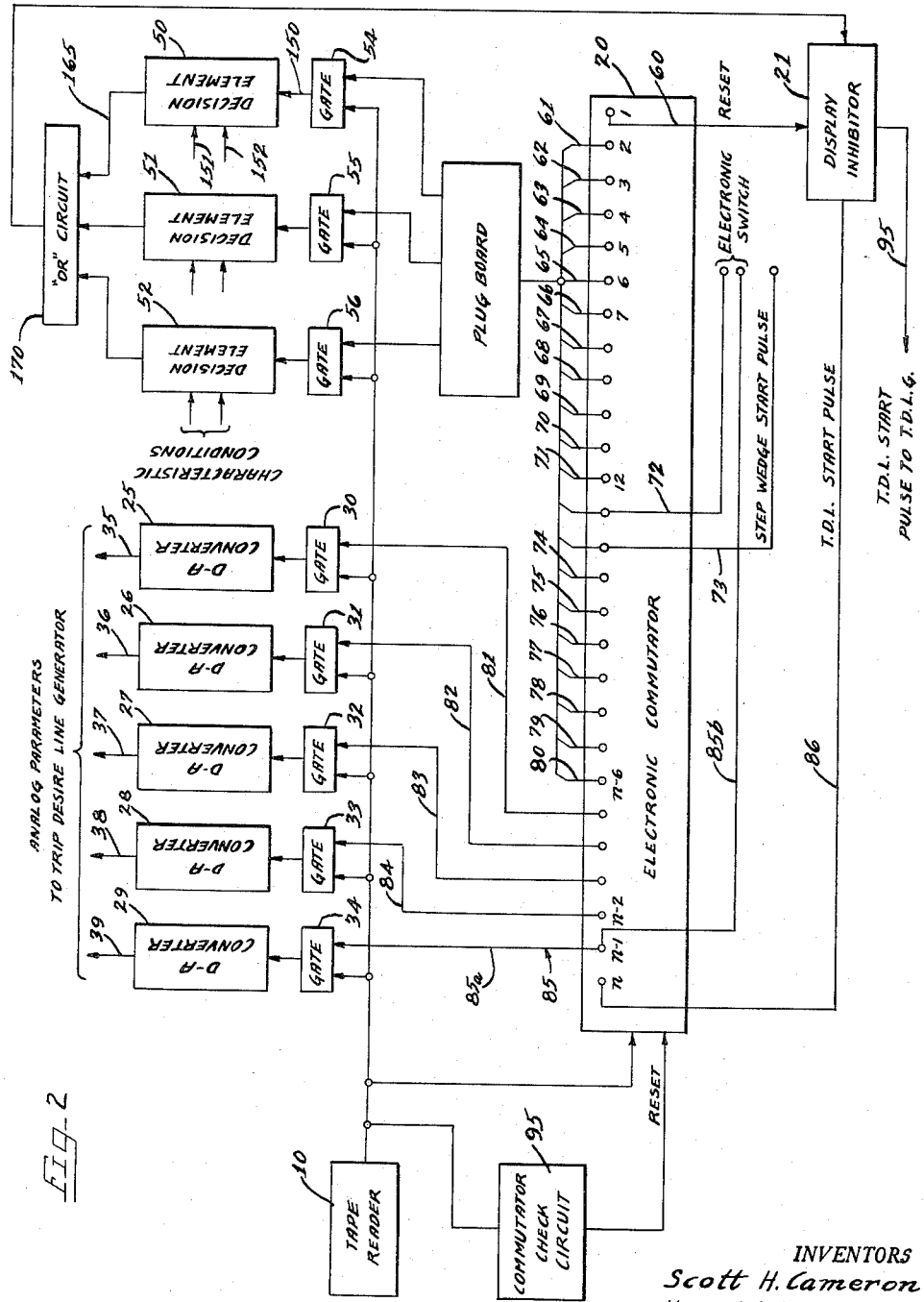

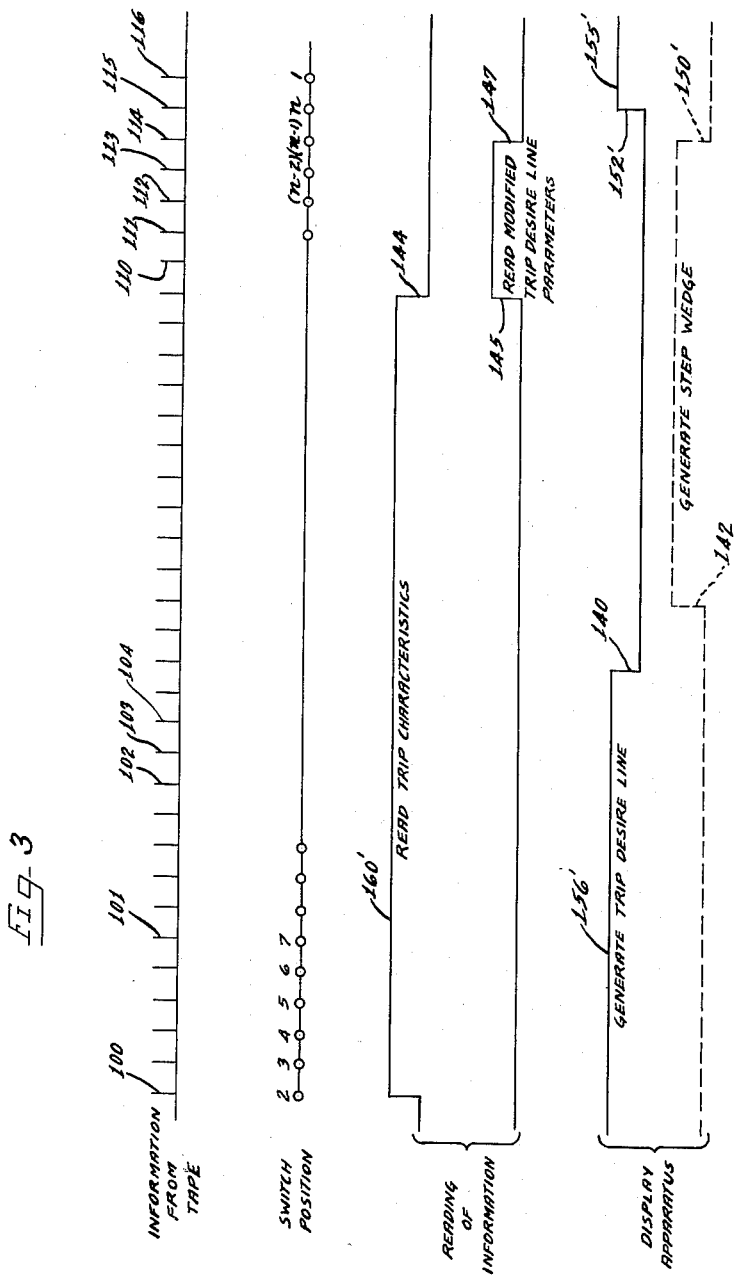

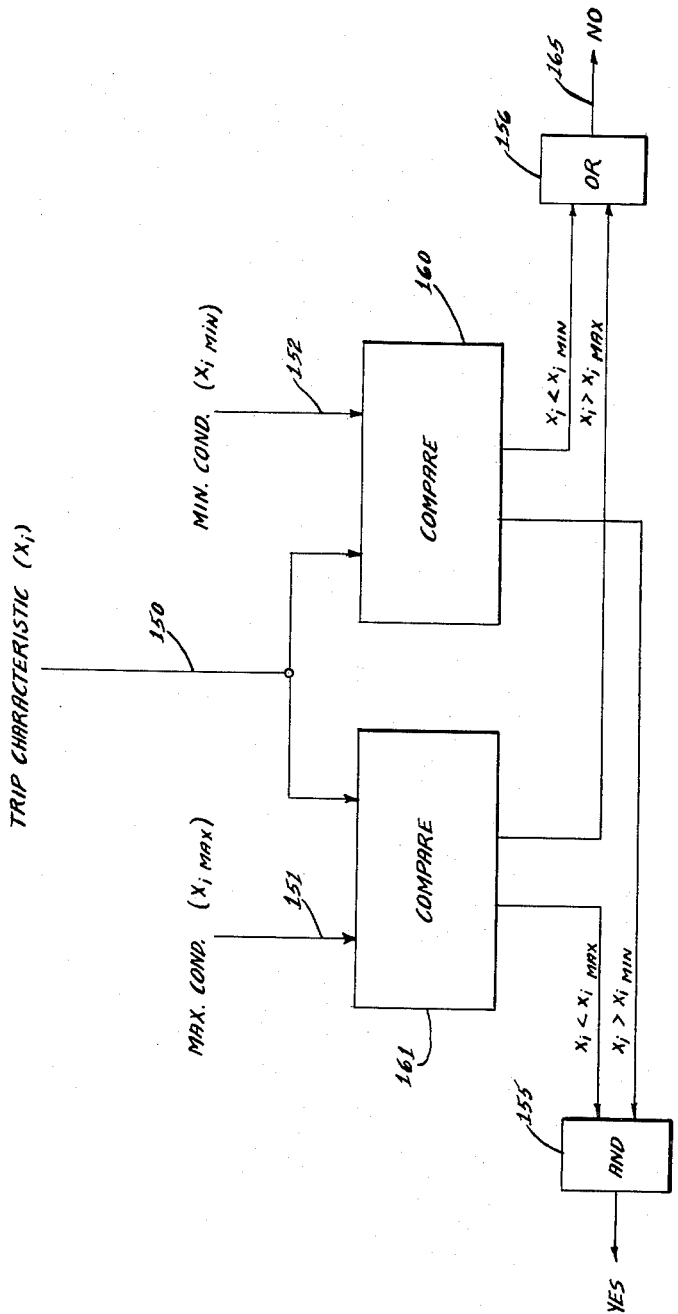

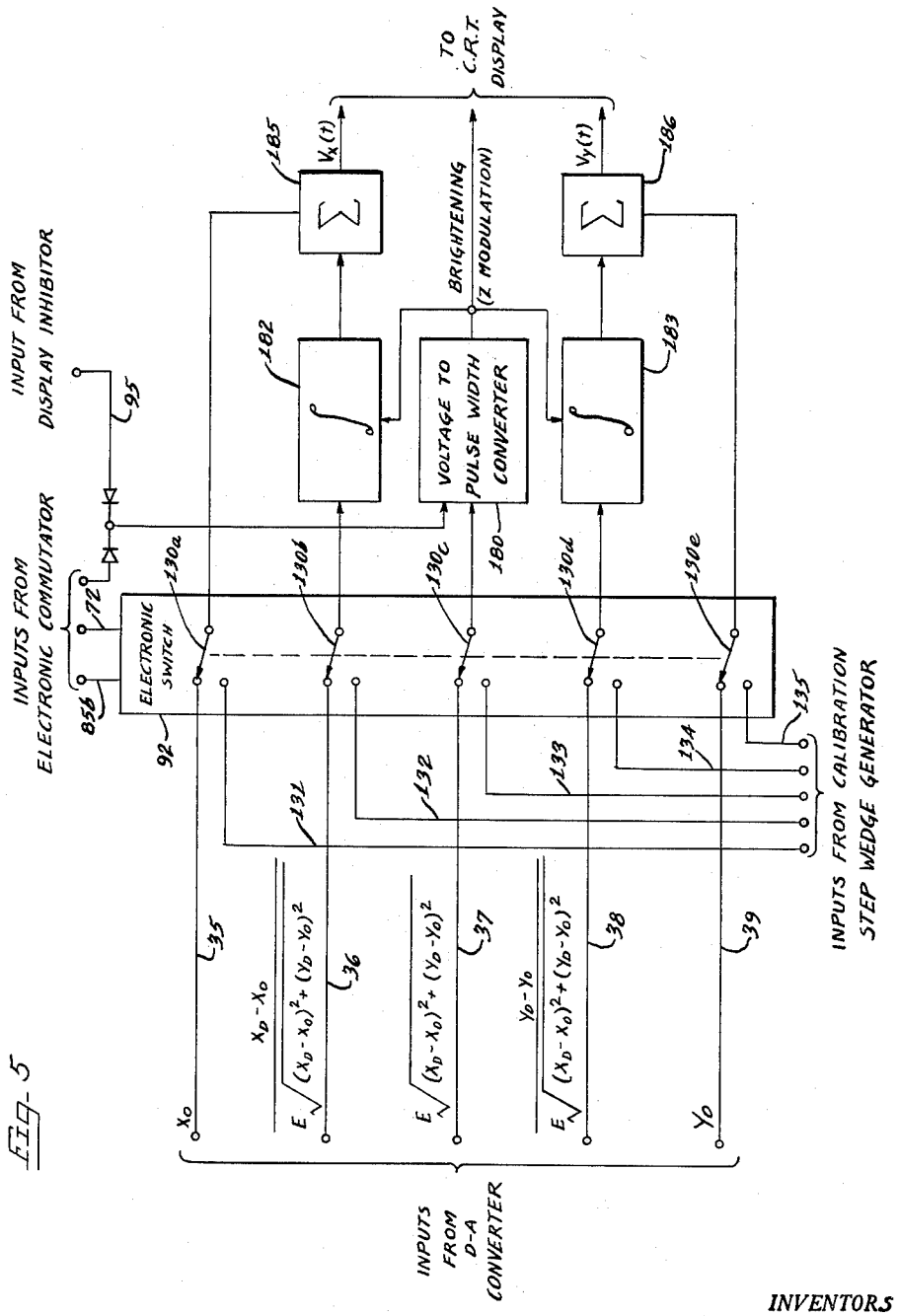

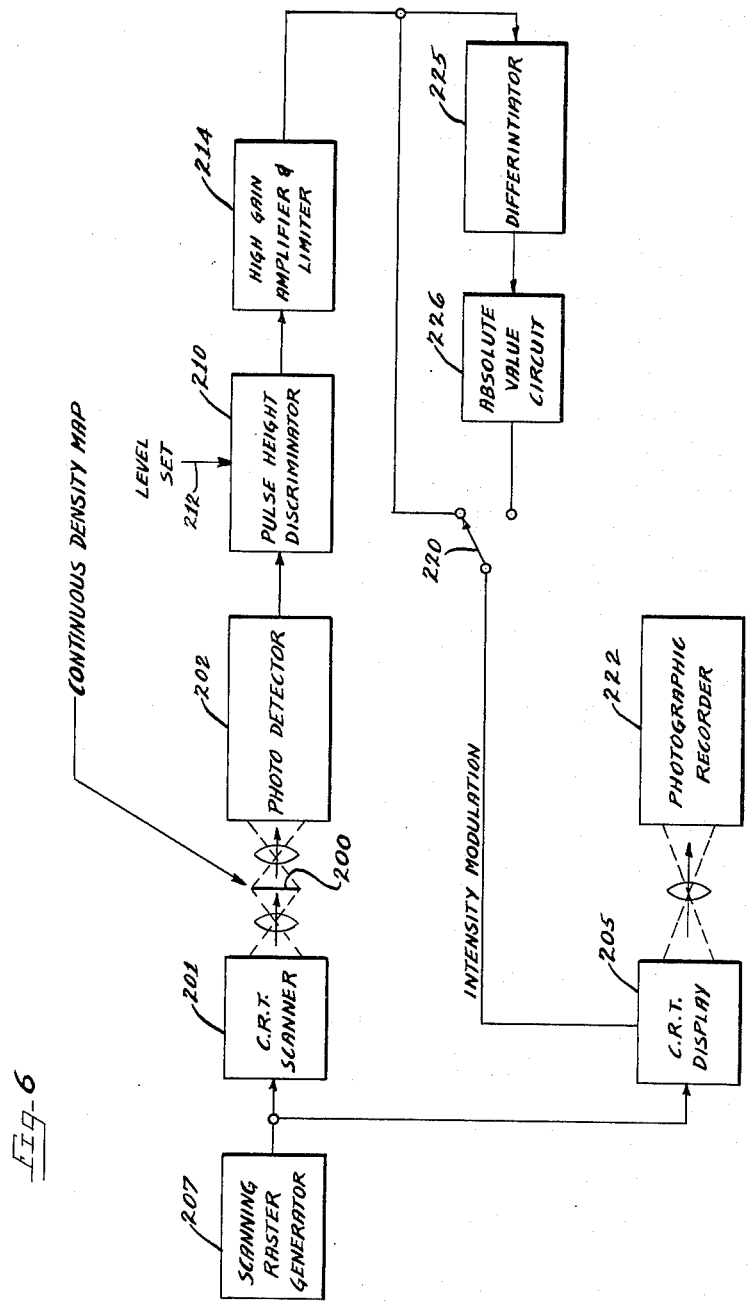

2,992,293
METHOD AND APPARATUS FOR GENERATING TWO-DIMENSIONAL DENSITY FUNCTIONS
Scott H. Cameron, Northfield, and Harold H. Kantner, Chicago, Ill., assignors to Armour Research Foundation of Illinois Institute of Technology, Chicago, Ill., a corporation of Illinois
Filed June 27, 1958, Ser. No. 745,013
15 Claims. (Cl. 178—6.8)

The present invention relates to a method and apparatus for generating two-dimensional density functions and particularly to a method and apparatus for producing a visible display of such functions.

It is an object of the present invention to provide a novel method and apparatus for generating a two-dimensional density function.

It is a further object of the present invention to provide a relatively rapid and efficient method and apparatus for converting a series of information units which may be represented as configurations such as lines, points or areas in a two-dimensional coordinate system into a variable density map corresponding to the sum of said configurations.

It is another important object of the present invention to provide a method and apparatus for generating a visible display of a large number of information units.

Yet another object of the present invention is to provide a novel method and apparatus for generating an equal density contour map from a two-dimensional density function.

Still another object of the invention resides in the provision of a method and means for generating point density functions.

A more specific object of the invention is to provide a method and apparatus particularly adapted to convert data which may be represented as a series of lines between given points within an area and representing samplings to be given different weights into a variable density distribution representing a relatively linear summation of such lines properly weighted.

A further more specific object of the invention is to provide a method and apparatus for selecting from a set of information units, units having predetermined characteristics and generating a two-dimensional density function representing the summation of the units having said predetermined characteristics in a single scanning of said units.

A subordinate object is to provide means for readily varying the characteristics to be selected with respect to said set of information units.

A further object of the invention is to provide an accurate means for correlating the optical density variation on a given variable density map generated by the apparatus of the present invention with the line density which has been recorded thereon.

Still another object of the invention is to provide a method and means for producing varying density maps which may be superimposed and their summation visually observed.

Other and further important objects, features and advantages of the present invention will be apparent from the following detailed description taken in connection with the accompanying drawings, in which:

FIGURE 1 is a simplified block diagram of an apparatus for generating two-dimensional density functions as particularly adapted to mapping trip desire lines in a traffic density study;

FIGURE 2 is a semi-detailed block diagram of certain of the components represented in FIGURE 1;

FIGURE 3 is a timing diagram of the operation of the apparatus of FIGURE 1;

FIGURE 4 is a functional block diagram illustrating the operation of the decision unit represented in FIGURE 1;

FIGURE 5 is a block diagram of the trip desire line generator of FIGURE 1; and

FIGURE 6 is a block diagram of an apparatus for the generation of equal density contours in accordance with the present invention.

As shown on the drawings:

While the present invention will be specifically described as it has been applied in connection with a survey of the transportation desires of a population of a given area, it is contemplated that the invention will have numerous other applications as will be apparent to those skilled in the art. For example, the apparatus will have utility in mapping the location of various articles in a warehouse, will have varied utility in connection with sales analysis and forecasting, and will be useful in connection with radioactive fall out predictions, civil defense damage assessments and the like. The apparatus is not limited to the plotting of actual geographical densities, for example, since abstract variables may be plotted, for example scatter plots such as utilized in statistical methods may be generated. Additional utility for the invention is contemplated in connection with demographic studies, meteorological surveys and mapping of airway patterns or the like.

In many cases, it is contemplated that the method and apparatus of the present invention will represent a tremendous savings over the use of conventional computer methods, and will provide results in a more convenient and usable form. The method and apparatus of the present invention has been recognized as the most practical solution proposed for plotting the results of a traffic density study of a large metropolitan area.

In such a traffic density study, a survey of the transportation desires of the population is conducted by means of home and roadside interviews of a representative sample of the population. Information is recorded in the form of trip desire descriptions which consist of a characterization of each desired trip in terms of point and time of origin, point and time of destination, reason for travel, mode of travel, place of residence, sex-race-age-occupation of the driver, and an estimate of the factor by which the trip should be expanded to learn the trip desires of the total population. This information is coded and stored on cards with one card containing the complete description of one trip. This card is called a trip card. For each trip the straight line joining the point of origin to the point of destination is designated as a trip desire line. In connection with the study, it may be desired to select a subset of cards on the basis of trip characteristics, for example mode, direction, reason for travel, distance, time of origin, etc., and over the entire surface of the study area, determine the density of trip desire lines corresponding to the selected subset in units, for example, of trip desire line intersections per quarter square mile. Each trip must be weighted by the appropriate expansion factor so that the result is representative of the entire population.

It is apparent that only a small portion of the information stored on the trip card is actually necessary to construct the corresponding trip desire line. In fact, the points of origin and destination completely define the line and the expansion factor is the only additional information required to enter that trip desire line into the overall trip desire density map. The additional information appearing on the card serves only, in this application, to identify the trip as belonging or not belonging to the subset of cards (trips) which are to enter into the construction of the particular density function desired. Information in the first category will be referred to as trip desire line parameters and information in the second category as trip characteristics. Clearly some of the information on the trip cards is in both of these categories since, for example, it may be desired to construct a density function corresponding to the subset of all trip cards which correspond to a specified direction of travel. This particular trip characteristic may be deduced from the coordinates of the points of origin and destination which information is also in the category of trip desire line parameters.

It has been found very convenient to describe the trip desire line by a set of parameters somewhat different from the parameters stored on the trip cards. It is also the case that the computations required to derive these modified trip desire lines parameters from the original parameters are difficult to carry out with sufficient speed and accuracy on an analog basis. On the other hand they may easily be carried out while the original information is in digital form. Rather than include the digital facility required to carry out these computations within the present apparatus, a general purpose computer computes the modified trip desire line parameters directly from the original trip cards during transfer of the data from the cards onto magnetic tape. Other computations may be carried out with ease within the general purpose digital computer for simplifying the subsequent sorting operation. For example, one of the trip characteristics on the basis of which selection may be effected is the direction of travel. The direction information appears only implicitly on the original trip card and the reduction of this information to a single number which is coded and stored on the magnetic tape would greatly simplify the sorting operation, on the basis of this characteristic.

For the purposes of the present embodiment, it will be assumed that the necessary computations have been carried out and that the magnetic tape entering the system diagrammed in FIGURE 1 contains the modified trip desire line parameters along with suitably coded trip characteristics.

Referring to the block diagram of FIGURE 1 the modified trip desire line parameters are read from the magnetic tape by means of a tape reader 10 and placed in storage registers within the digital-to-analog converter 11. The digital-to-analog converter provides analog potentials proportional to the modified parameters at the input of a trip desire line generator 12. The trip desire line generator provides (upon receipt of a starting pulse) a set of voltages suitable for application to the deflection and intensity control circuits of a cathode ray tube display device 13. The cathode ray apparatus displays a straight line trace at an appropriate position on the face of the cathode ray tube having a brightness related directly to the expansion factor corresponding to the particular trip. The face of the cathode ray tube is imaged by means of a suitable optical system 15 onto a photographic recorder 16 which may be in the form of a photographic emulsion which is exposed by the trip desire line. Exposure of the emulsion by a collection of such lines and subsequent development of the exposed emulsion results in a trip desire density map in which the optical density of each small area of the emulsion is related directly to the density of trip desire lines which occur in that area, i.e., the desired density function corresponding to the subset of trip desire lines which has been displayed by the cathode ray tube display device 13.

The trip characteristics, which are also stored on the magnetic tape, are read into suitable digital storage registers in the device 18 labeled on the block diagram as the decision unit. Each storage register in the decision unit is part of a circuit combination called a decision element.

The function of the electronic commutator 20 is to sort the information being read from the tape into the appropriate digital storage registers as well as to provide a starting pulse to the trip desire line generator 12 through the display inhibitor 21. The display inhibitor will permit the starting pulse to appear at its output if the verdict of the decision unit has been "yes" and will block the starting pulse if the verdict has been "no." A second function of the electronic commutator is to coordinate the generation of a calibrating step density wedge by means of a step wedge generator 22 with the presentation of the trip desire line. The density wedge is generated on the photographic emulsion in an area not corresponding to any portion of the total study area and is built up by exposure of various portions of the emulsion to preset numbers of line traces. The various optical densities of this section of the developed emulsion will permit accurate calibration of the resultant map in terms of optical density versus trip desire density. The trip density and the associated calibrating step wedges will have an additive property; that is, the density map corresponding to the sum of all trips employed in the construction of a set of density maps may be obtained by superposition of the set of density maps.

It will be understood by those skilled in the art that the sorting or decision making function may be conducted outside of the device of the present invention in which case the magnetic tape entering the tape reader 10 would contain trip desire line information related only to the trips to be included in the density map being generated. In this case the decision unit 18 and display inhibitor 21 would be omitted.

The following is a description in greater detail of the apparatus of FIGURE 1.

Digital-to-analog converter

The function of the digital-to-analog converter 11 is to interpret the trip parameter information recorded on the tape in digital form and convert this to suitable analog voltages for use in the trip desire line generator 12. A total of five separate parameters must be so converted in order to provide sufficient input data to the generator. Thus, the digital-to-analog converter will actually consist of five sub-units 25–29 as seen in FIGURE 2.

FIGURE 2 illustrates the functional relationship of the digital-to-analog converters to the tape reader 10 and the electronic commutator 20. Each converter has an associated gate circuit 30–34 which will control the actual flow of information to the converter register of the respective converter units 25–29. The outputs of the converter units 25–29 comprise the modified trip parameters in analog voltage form and are indicated as being connected to the input to the trip desire line generator shown in FIGURE 5 by means of output lines 35–39.

Electronic commutator

The operation of the electronic commutator is represented in FIGURE 2. This unit acts to control the flow of information from the tape reader 10 into the storage registers of the respective decision elements 50, 51 and 52 and converter units 25–29. The commutator is essentially a multi-position uni-directional switch, providing a single output at any one time and successively advancing to the next position for each character of information read from the tape.

As the trip information is read from the magnetic tape, every character of information will appear at the inputs to gates 30–34 of the converter units and gates 54, 55 and 56 of the decision elements 50–52. However, an additional input to each gate is required from the electronic commutator 20 before the gate is "opened" and the information is actually registered in the decision elements or digital-to-analog converter units. Each of the multiple outputs represented by lines 60–86 of commutator 20 corresponds to a definite position relative to the total message length on the tape, so that trip information must always be recorded on the tape in a pre-determined manner.

The operation of the electronic commutator unit is as follows. The last pulse of the previous message or information unit (corresponding to a trip card) will have caused the active output of the electronic commutator 20 to move from position 1 corresponding to output line 60 to position 2 corresponding to output line 61. Trip characteristic information will then be read from the tape and the electronic commutator will act as a counter, successively advancing to the next output position and activating that output as each digit is read. The gates 54–56 to the decision elements 50–52 will be opened in succession to receive trip characteristics in the positions previously established on a plugboard 90. For example, output line 61 of the commutator may be plugged into plugboard 90 to connect with gate 54, output line 66 may be connected with gate 55 and output line 71 may be connected with gate 56 by means of the plugboard 90.

While the trip characteristic information is being read, the previous trip desire line is being generated in the trip desire line generator 12. At a predetermined position (based on the total number of trip characteristics recorded on the tape), the electronic switch indicated at 92 in FIGURE 5 which controls the input to the trip desire line generator is activated by means of output line 72 of electronic commutator 20. Prior to this time, the previous trip desire line has been completed. The following position indicated by output line 73 in FIGURE 2 then provides a starting pulse for step wedge generator 22. The step wedge generator is then in operation until position n–1 of the commutator is reached corresponding to output line 85b, when the electronic switch 92 of FIGURE 5 is again actuated. Positions n–5 to n–1 corresponding to output lines 81–85 are used to open the digital-to-analog converter gates 30–34 in succession at which time the modified trip desire line parameters are registered in the digital-to-analog converter units 25–29. Position n corresponding to output line 86 then provides a starting pulse for the trip desire line corresponding to the parameters just read. This starting pulse is routed to the display inhibitor 21 as shown in FIGURE 2 which acts as a gate to the trip desire line generator 12 as indicated by output line 95 in FIGURES 2 and 5. A second input to the display inhibitor is the output of the "or" circuit 170 from the three decision elements 50–52. If a "no" answer has resulted from comparisons in any one of the decision elements, 50–52, no starting pulse will be sent to the trip desire line generator via output line 95 and thus that trip will not be displayed. Otherwise, a starting pulse is generated and the trip desire line will be generated during the time in which trip characteristic information for the next trip is being read.

It is clear that the system as thus far described would be an operative system only if the electronic commutator is "in step" with the trip message at the beginning of the tape (i.e., as each information sub-unit is being read from the tape the commutator is in the position appropriate to that particular information sub-unit) and further that this condition is maintained throughout the length of the tape. In any practical system we must allow for the possibility of certain types of malfunctions which would cause the commutator to fall "out of step" with the trip message. This could occur for example if the commutator failed to advance after having received an information sub-unit, or advanced due to a noise pulse when in fact no information sub-unit had been received, or due to a tape flaw one or more information sub-units are not recognized from the tape. If any of these errors should occur (in the system as thus far described) the electronic commutator would fall out of step and very probably remain so during the balance of the tape reading operation. In order to guard against this possibility the following procedure may be adopted. As one of the information sub-units in each trip message, for example 116, we record a code number which does not ever appear in any other information sub-unit. The tape output information is then introduced into the commutator check circuit 95, FIGURE 2. This circuit has the ability to recognize the code number recorded as information sub-unit number 116. An output from this circuit implies that this particular number is being read from the tape and the electronic commutator should be in a particular position (commutator position number 1 in this example). If we call this position the commutator reset position the output signal from the commutator check circuit has the property that it puts the electronic commutator into the appropriate position, i.e. reset, whether or not it already resides in the reset condition. The system now has the property that a single error will upset at most one trip, after which time the electronic commutator will be forced back into step with the trip message information.

Referring to the timing diagram of FIGURE 3, the top series of vertical lines may represent the information recorded on the magnetic tape relating to a particular trip card and will be termed an information unit herein. Each vertical line such as 100, may be termed an information sub-unit and may, for example, represent a number between 1 and 130. Information sub-units between the unit 100 and 110 may relate to trip characteristics while information sub-units corresponding to marks 110 through 114 may represent the modified trip desire parameters in digital form. Each information sub-unit may comprise an initial pulse capable of actuating the gates 30–34 and 54–56, followed by the trip information in digital form, and finally a pulse capable of causing the electronic commutator to step to the next position. Thus the information sub-unit associated with mark 100 in FIGURE 3 is transmitted by the electronic commutator to output position 2 whereupon gate 54 is opened and the trip characteristic information associated with this information sub-unit is delivered to decision element 50. Similarly, the information associated with sub-units 101 and 102 is delivered to decision elements 51 and 52. The initial pulse associated with sub-unit 103 actuates electronic switch 92 in FIGURE 5 to shift the contact arms 130a–130e in FIGURE 5 to their lower position to disconnect the converters 25–29 from the line generating circuits 180, 182, 183, 185 and 186 and to connect the inputs represented by lines 131–135 from the calibration step wedge generator 22 to the line generating circuits. Generation of the previous trip desire line is now completed as represented by the vertical line 140 in FIGURE 3. Information sub-unit 104 includes an initial pulse which appears at output line 73 of the electronic commutator in FIGURE 2 to start the step wedge generator as indicated by the dashed vertical line 142 in FIGURE 3. When the successive information sub-units have caused the electronic commutator to step to output line 80, reading of trip characteristics terminates as indicated by the vertical line 144 and reading of modified trip desire line parameters begins as indicated by the vertical line 145 in FIGURE 3.

The initial pulse associated with information sub-unit 110 appears at output line 81 of the electronic commutator to open gate 30 and register the associated modified trip desire line information at converter unit 25. Similarly, the information associated with information sub-units 111–114 is recorded at converter units 26–29. The initial pulse associated with information sub-unit 114 also appears at output line 85b to actuate electronic switch 92 and move the contact arms 130a–130e (in the diagrammatic showing) to their upper positions to connect lines 35–39 at the outputs of the converter units to the trip desire line generator circuits. The termination of the reading of the trip desire line parameters is indicated by the vertical line 147. Generation of the step wedge is interrupted as indicated by the dash vertical line 150′ in FIGURE 3. At the information sub-unit represented by the mark 115 in FIGURE 3, a start pulse appears at line 86 of the commutator in FIGURE 2 which starts the trip desire line generator as indicated by the vertical line 152′ in FIGURE 3, providing the trip characteristics represented by the information sub-units 110–114 satisfy the requirements established at the decision elements 50–52. As previously mentioned, and as indicated by the horizontal lines 155′, 156′ in FIGURE 3, the trip desire line generator 12 will generate the line determined by the converter units 25–29 during the time in which the trip characteristic information for the next trip is being read as represented by the horizontal line 160′ in FIGURE 3. The last pulse of the next succeeding information sub-unit 115 causes the commutator to step from position n to position 1. The initial pulse of sub-unit 116 appears at line 60 to reset the display inhibiter 21. The last pulse of sub-unit 116 causes the electronic commutator to move from position 1 to position 2 in readiness for the next information unit on the tape.

Decision unit

The operation of decision elements 50–52 of the decision unit is illustrated in FIGURE 4. Each decision element has the property that it will provide a "yes-no" indication of whether or not a given trip characteristic satisfies certain predetermined conditions identified with a number stored in a storage register of the decision element. For example, the trip characteristic associated with one dicision may be the mode of travel, and the desired density function may be one which includes only truck traffic. The truck mode may be identified by the number 7 appearing in the storage register of that particular decision element. The conditions imposed are such that a "yes" answer is provided if and only if the number in the register is less than 8 and greater than 6. A "yes" answer from each of the decision elements is necessary in order that a starting pulse be provided to the trip desire line generator 12 to initiate presentation of the trip desire line to the photographic recorder 16. Although there exists a large number of trip conditions which may at some time enter into the decision to include or not to include a particular trip in the construction of a density function, it is unlikely that more than three trip characteristics would be used in the generation of any one map. In the illustrated embodiment, therefore, only three decision elements 50–52 have been provided which may be used to test any of the trip characteristics on an interchangeable basis. It is possible to expand this to any number of decision elements should the need occur.

The selection of the three characteristics for a particular map is made by interconnecting the gating circuit for each decision element to the appropriate position on the electronic commutator 20 through a plug board 90 as described in connection with FIGURE 2. The gating circuits 54–56 which are in fact component parts of the decision elements will allow only the pre-selected trip characteristics to be registered in the decision elements although information recorded on the tape will appear at the input to all the gates. The output of gate 54 in FIGURE 2 is designated by reference numeral 150 to indicate the correlation between FIGURE 2 and FIGURE 4 where the numeral 150 designates the input to a decision element. The decision elements 50, 51 and 52 are identical and each may operate as illustrated in FIGURE 4. External conditions, or the predetermined limits on trip characteristics which must be compared with the trip information recorded on the tape to yield a "yes" or "no" answer from the decision elements will be set by manual controls as diagrammatically represented by the input lines 151 and 152 in FIGURES 2 and 4. These controls are constructed such that they will be applicable to any of the trip characteristics.

In FIGURE 4, both the "yes" and "no" components as represented by the "and" circuit 155 and the "or" circuit 156 are not required, and only the "no" components including "or" circuit 156 are represented by elements 50–52 in FIGURE 2. Referring to the previous specific example, if the information unit being read by the tape reader 10 is for the truck mode, the input trip characteristic $x_i$ will equal 7 in the hypothetical illustration in digital form. The minimum condition $x_i$ min will be 6 and the maximum condition $x_i$ max will be 8. The minimum comparison circuit indicated at 160 will compare $x_i$ with $x_i$ min and produce an output if $x_i$ is less than $x_i$ min; in the present case since 7 is not less than 6, there will be no output from the comparison circuit 160. Similarly, since $x_i$ is not greater than $x_i$ max, there will be no output from comparison circuit 161. The result is that the input trip characteristic is found to conform to the requirements of the decision element and this is indicated at the output 165 of "or" circuit 156 by the lack of a "no" signal. It will be understood that if the input trip characteristic $x_i$ failed to satisfy the maximum or minimum condition as represented in FIGURE 4, "or" circuit 156 would produce a "no" output signal at 165 which would be transmitted by "or" circuit 170 in FIGURE 2 to the display inhibiter 21 to prevent the transmission of a start pulse to the trip desire line generator 12. The manner in which the "and" circuit 155 would cooperate with a display control circuit will be apparent to those skilled in the art.

While the decision elements may operate with either analog or digital inputs, a digital operation provides high accuracy and has been illustrated by way of example in the present embodiment. Where less accuracy is acceptable, the analog technique may be advantageous in terms of cost and complexity.

Trip desire line generator

The function of the trip desire line generator 12 can be stated as follows. Given a description of a trip desire line in terms of the coordinates of the points of origin and destination and the weight or expansion factor associated with the trip, develop voltages suitable for application to the intensity control circuits and deflection circuits of the cathode ray tube display device 13. It is evident that in order to take into account the expansion factor associated with a particular trip desire line the apparent brightness of the line trace on the cathode ray tube screen must take on a value directly proportional to the expansion factor. This may be accomplished by either of two possible techniques—the cathode ray tube beam current can be adjusted or the writing rate may be controlled. Of these two possibilities the second is more attractive since the relationship between trace brightness and cathode ray tube grid-cathode potential is exceedingly non-linear, subject to drift, and requires some sort of optical feedback for effective operation, whereas the relationship between writing rate and trace brightness is a simple, well behaved, inverse function. It is proposed therefore to cause the rate at which the cathode ray tube trace is displayed to vary inversely as the expansion factor and to be independent of the direction of the line. In order to produce a deflection of the cathode ray tube beam which causes the spot to begin at the point of origin and proceed along a straight line path to the point of destination at a velocity inversely proportional to the expansion factor, the voltages which must be applied to the deflection axis of the cathode ray tube display device are given as follows:

$$v_x(t) = K\left[X_0 + \int_0^t \frac{V(X_D - X_0)dt}{E\sqrt{(X_D - X_0)^2 + (Y_D - Y_0)^2}}\right]$$

$$v_y(t) = K\left[Y_0 + \int_0^t \frac{V(Y_D - Y_0)dt}{E\sqrt{(X_D - X_0)^2 + (Y_D - Y_0)^2}}\right]$$

where, $v_x(t)$ and $v_y(t)$ are the horizontal and vertical deflection potentials; K is a proportionality constant; $X_O$, $Y_O$, $X_D$, $Y_D$ the coordinates of the points of origin and destination respectively, V a constant, and E the expansion factor. Of the many operations required to construct these functions only the linear operations are convenient to carry out on an analog basis, i.e., addition and integration. The analog equipment required for the non-linear operations is either too slow for this application or not sufficiently accurate. It is therefore proposed to conduct these non-linear operations on a digital basis in the process of transferring the trip desire line parameter information from the IBM trip cards to magnetic tape storage and to provide to the trip desire line generator a set of modified parameters, i.e., instead of the parameters $X_O$, $Y_O$, $X_D$, $Y_D$, and E—the parameters $X_O$, $Y_O$, $$\frac{(X_D-X_O)}{E\sqrt{(X_D-X_O)^2+(Y_D-Y_O)^2}}$$

$$\frac{(Y_D-Y_O)}{E\sqrt{(X_D-X_O)^2+(Y_D-Y_O)^2}}$$

and $$E\sqrt{(X_D-X_O)^2+(Y_D-Y_O)^2}$$

The parameter $$E\sqrt{(X_D-X_O)^2+(Y_D-Y_O)^2}$$

is proportional to the time required to proceed from the origin to destination and is employed to turn the cathode ray tube beam off at the proper time. A block diagram of the system is shown in FIG. 5. The electronic switches $130a$–$130e$ are employed to transfer the input from the digital-to-analog converter lines 35–39, to lines 131–135 which introduce potentials which cause the generation of the calibrating step wedge. If it is assumed that the electronic switch 92 is accepting the modified trip desire line parameters it is clear that the X deflection potential will be equal to the sum of $X_O$ and the time integral of the appropriate velocity quantity. Likewise for the Y deflection potential. The voltage-to-pulse-width converter 180 has the property that it produces an output pulse starting at the receipt of a starting pulse via line 95 from display inhibitor 21 and ending at a time related directly to the quantity $$E\sqrt{(X_D-X_O)^2+(Y_D-Y_O)^2}$$

The output pulse of the voltage-to-pulse-width converter is employed to unblank the cathode ray tube display and to start and reset the integrators 182 and 183. The time integration of the inputs from lines 36 and 38, and the inputs from lines 35 and 39 are added by summing circuits 185 and 186 to provide the required horizontal and vertical deflection voltages.

With the electronic switch 92 in the alternate position the operation is identical except that the control potentials are arranged to develop the step wedge density function rather than the trip desire density function.

It will also be possible to employ this apparatus in unaltered form for the generation of point density functions by the following artifice. The point information is stored on the input tape in the position normally used for identification of the point of origin. The horizontal and vertical velocity components are set equal to zero and the trip time parameter proportional to the weight to be associated with the point. The processing of this tape will result in the corresponding point density function.

Calibration step wedge generator

Following the presentation of each trip desire line, a line is generated at the bottom (or top) of the photographic emulsion for the purpose of building up a calibrating step wedge. After the presentation of a preset number of over-laid lines of a particular length, the length is changed automatically to a different value, and the process repeated. For example, the first 1000 lines may each cover the entire length of the step wedge, the next 1000 ⅞ of the length, the next ⅝, etc. Physically the step wedge generator 22 consists of a standard electronic counter which will count the number of step wedge lines presented and advance a mechanical stepping switch after a preset number of lines. The stepping switch is wired to provide analog potentials to the trip desire line generator suitable for the generation of the aforementioned lines.

Cathode ray tube display

The cathode ray tube display device 13 consists of a cathode ray tube associated with well regulated supply potentials (in order to maintain constant beam current) and a pair of low drift, direct coupled deflection amplifiers.

In order to operate effectively in this application the cathode ray tube phosphor must be such that it is possible to control the apparent brightness of each trace in accordance with the "weight" (expansion factor) to be associated with the sample represented by the trace. Although it would be conceptually possible to accomplish the same result by repetitive display of a constant brightness trace for each sample, it is apparent that this approach would either slow the operating speed of the equipment (in terms of the samples processed per unit time) or place extreme bandwidth requirements on the circuits which generate the deflection potentials, particularly if the apparatus must accommodate samples having associated with them a large range of weights. Another disadvantage of this approach is that the weights which can be accommodated are restricted to integral multiples of the weight associated with one trace.

A better approach is to employ a single trace for each sample and to control the apparent brightness of the trace in accordance with the weight. The exposure of an element of film which is traversed by a particular trace may be conditioned by (1) control of the cathode ray tube beam energy, (2) control of the trace velocity, (3) control of the optical transmission from the cathode ray tube face to the photographic emulsion, (4) a combination of the above techniques. Control of the beam energy is not a particularly desirable approach due to the non-linear relationship which exists (in present day cathode ray tubes) between beam current and grid-cathode potential. Control of the optical transmission is difficult to accomplish at high operating speeds but may be used effectively in combination with other means to extend the dynamic range of control. It is felt that the most reasonable approach at the present time is the control of trace velocity. The exposure of an element of film by the display of a single sweep of the cathode ray beam over the surface of a phosphor may be expressed approximately as follows:

$$E=k\left[\frac{d}{v}+(T_2-T_1)(1-e^{-d/vT_1})\right]$$

where:
$E$ = exposure of an element of film
$k$ = constant of proportionality
$d$ = diameter of the cathode ray tube spot
$v$ = trace velocity
$T_1$ = time constant characterising phosphor build up
$T_2$ = time constant characterising phosphor decay As can be seen from the above expression, a simple inverse relationship between exposure and trace velocity may be approximated by suitable choice of the phosphor characteristics $T_1$ and $T_2$. The above expression reduces to the form $$E=\frac{\text{constant}}{v}$$

under any of the following conditions:
(1) $T_1 \ll d/v$ and $T_2 \ll d/v$
(2) $T_1=T_2$
(3) $T_1 \gg d/v$ The approach represented by (1) above is considered to be the most practical since only in this case is the constant of proportionality independent of the values $T_1$ and $T_2$. In practice the phosphor characteristics represented by the parameters $T_1$ and $T_2$ depend to some extent on ambient temperature and operating beam current. In addition to satisfying the requirements stated in (1) above the phosphor should have a useful light output which is as large as possible in order to increase the range of functional densities (e.g. trip desire line densities in this example) which may be accommodated. In addition the efficiency of the phosphor should be unaffected by temperature, fatigue, and time insofar as possible.

With respect to the present application of this device the most appropriate cathode ray tube phosphor currently available is apparently one which bears the RETMA designation P16.

Photographic recorder

The photographic recorder 16 consists, basically, of a modified commercially available camera whose lens stop has been calibrated in terms of trip desire line densities. The film must be exposed in the linear density range in order to preserve the additive property of the final maps. The calibrating step wedge, however, permits the generation of a non-linear, non-additive map having readable densities which vary over a still larger range.

The photographic emulsion characteristics of interest in this application are (1) film speed, (2) spectral compatability with the cathode ray tube phosphor, (3) density range, (4) linearity of the H and D curve (film density versus log exposure) and (5) intermittency effect.

High film speed and spectral compatability with the CRT phosphor are important in the sense that the higher the speed of the system the wider the range of application. The speed may always be reduced by reduction of the relative aperture of the optical system but the limiting sensitivity is determined by the effective film speed.

A large density range permits the examination of a large range of functional densities on a single chart. The larger the density range of the film the larger the range of functional densities which may be determined with a given accuracy. A linear H and D characteristic gives the resultant charts the so-called additivity property.

The intermittency effect is observed in varying degrees in different film types and is evidenced by a dependence of the developed emulsion density on the time interval between members of a sequence of light pulses impinging on an element of the emulsion. The apparatus for the generation of two-dimensional density functions in concept relies on the fact that the density of the developed film at any point will be a function only of the total exposure and independent of the time history of the exposure. The intermittency effect represents a failure (to some extent) of this assumption and, to the extent that it is present in the film employed, will result in a degradation of the accuracy of the system. Clearly selection of an emulsion with the smallest possible intermittency effect will maximize the accuracy of the system.

At the present time, the most suitable films for this application are considered to be Eastman Kodak film types, Plus-X and Tri-X.

Apparatus for the generation of equal density contours

The trip density map, which results from the automatic trip density map generator shown in FIGURES 1 to 5, portrays the trip density function as a continuous function of two variables. It is convenient to provide an additional representation of this information in the form of displays or charts in which either selected contours of equal density or zones of desired density intervals are apparent. Such contour or zone charts permit a ready visualization of the resultant information as well as a flexible and convenient technique for the reproduction of the data.

A technique for the conversion of the continuous density maps to the equal density or density interval contour charts is illustrated in block diagram form in FIGURE 6. The continuous density map 200 is interposed between a cathode ray tube 201 and a photoelectric detector 202. The CRT scanner spot is caused to scan the surface of the continuous density map 200 in synchronism with a second spot on the screen of the device labeled CRT display 205. If the spot intensity in the CRT scanner 201 is held constant, the output of the photo detector 202 will be a video signal describing the continuous density map in terms of the applied scanning raster from generator 207. The photo detector output and voltage is by definition zero when a clear or minimum density portion of the continuous map is being scanned and increases when higher density regions are encountered. This video signal is applied to the pulse height discriminator 210. The pulse height discriminator has the property that the output is zero if the input is less than the desired level and equal to the input if the input exceeds the desired level. The desired level may be adjusted at will as indicated by line 212 and may be calibrated, for example, in terms of trip desire line intersections per quarter square mile. The output of the pulse height discriminator is passed through a high gain amplifier and limiter 214. The output of the high gain amplifier and limiter has the property that it is zero if the area being scanned at that instant has a trip desire density less than the set value and an output of unity if the area has a density greater than the set value. With the system operating with the switch 220 in the position indicated, the output of the high gain amplifier and limiter is applied directly to the intensity control axis of the CRT display 205. The developed emulsion from the photographic recorder 222 will be essentially transparent everywhere that the trip desire density is less than the set value and have a particular optical density everywhere that the trip desire density exceeds the set value. If the continuous density map is scanned a number of times before the emulsion is developed with the desired level set to a different value for each raster scan, the developed record will portray the original density map in a quantized fashion with a particular optical transmission corresponding to trip desire line densities in a particular interval. If the sequence of scans previously described is conducted with the switch in the other position, the resulting record produced with the use of differentiator 225 and absolute value circuit 226 will consist of a set of closed line curves each of which represents a contour of equal trip desire line density.

It is anticipated that a device of the sort described will find use in at least two different applications. First, it will be exceedingly useful for the reduction of the information to a convenient form for reproduction. Second, it will permit visual observation of the trip desire line data in several interesting forms. For example, the CRT display 205 could be observed directly while the continuous density map is scanned in a repetitive fashion. The level set could be adjusted while viewing the display, thereby permitting the convenient location and measurement of various maxima and minima appearing in the original density map.

Still another variation of considerable interest would be the use of two pulse height discriminators connected to the output of photo detector 202 in place of pulse height discriminator 210 in FIGURE 6 in a circuit for example including an "and" circuit having one input connected to the output of the amplifier and limiter of the lower limit discriminator and having its second input connected to the upper limit amplifier and limiter through a "not" circuit, whereby the cathode ray beam of display 205 is turned on only if the threshold setting of the lower limit pulse height discriminator is exceeded and the threshold setting of the upper limit discriminator is not exceeded, i.e. if the output of one of the corresponding amplifier and limiter combinations is unity and the output of the other is zero. In this case the resulting record would consist of a set of closed bands in which the shape of the bands depends on discriminator settings.

*Summary of operation of embodiment of FIGURES 1 to 5*

The operation of the apparatus for generating two dimensional density functions as illustrated in FIGURES 1 to 5 will now be summarized. A tape or other suitable source of input information which is to be plotted as a density function is first prepared. In the illustrated embodiment, the input information may be visualized as a series of construct lines extending between points in a two-dimensional coordinate system. The successive information units may represent successive lines of variable length and variable location throughout a given area of a two-dimensional system. Further, the present invention particularly relates to the situation wherein a further variable is to be represented in terms of the weight of the successive construct lines.

In the illustrated embodiment, a sorting function is also included in the apparatus so as to enable the apparatus to select certain of the information units from the entire set on the basis of selected characteristics associated with the information units and recorded on the tape in association with the respective information units. Thus, each information unit recorded on the tape may include $n$ information sub-units with a first group of said sub-units relating to characteristics and a second group of said sub-units specifying the values of variables from which the two-dimensional density function is to be generated.

As specifically illustrated in FIGURE 2, a first series of information sub-units which are read from the tape by means of the tape reader 10 successively step electronic commutator 20 between positions 2 and $n$–6. Assuming that information sub-units corresponding to points 2, 7 and 12 of the electronic commutator are of interest, the corresponding output lines 61, 66 and 71 are connected to the respective gates 54, 55 and 56 of decision elements 50–52 by means of plug board 90. If the characteristics of the information unit which are tested by the decision elements 50–52 are found to conform with the characteristic conditions imposed on the respective decision elements, the particular information unit is accepted for inclusion in the density function generated. Sub-units of information on the tape corresponding to positions $n$–5 to $n$–1 on the electronic commutator 20 in FIGURE 2 are gated into converter units 25 to 29 in FIGURE 2 where the variables previously described are converted from a digital to an analog form. If the information unit meets the predetermined characteristic conditions, the decision elements 50–52 allow the display inhibiter 21 to send a starting pulse to line generator 12, FIGURE 1, when the information sub-unit on the tape corresponding to the $n$ position of the commutator 20 has been reached.

The start pulse is supplied to the voltage to pulse width converter 180 in FIGURE 5 as indicated by line 95 to initiate display of the line corresponding to the information unit. The analog inputs $X_O$ and $Y_O$ in FIGURE 5 from converter units 25 and 29 in FIGURE 2 determine the initial position of a cathode ray spot on a cathode ray tube display device 13 shown schematically in FIGURE 1. The voltage to pulse width converter 180 causes the cathode ray beam to assume a predetermined intensity for the duration of the pulse output from converter 180. The duration of the high intensity condition of the cathode ray beam is determined by the analog input variable at line 37 in FIGURE 5. The start pulse causes the converter 180 to initiate operation of the integrating circuits 182 and 183 which proceed to produce at their output the time integral of the variables at input lines 36 and 38 in FIGURE 5. The integrated output from circuits 182 and 183 is added to the input analog quantities $X_O$ and $Y_O$ over the period of the pulse from converter 180 to generate $x$ and $y$ deflection potentials for the cathode ray tube which cause the cathode ray beam to trace a line corresponding to the information unit recorded on the tape. It will be apparent from a consideration of the input variables that the greater the expansion factor or weight E to be given the line, the slower will be the deflection of the cathode ray beam for a given length of line, and, of course, the longer will be the duration of the high intensity beam level.

The method of the present invention further contemplates the summation of the successive lines which are displayed by means of a photographic recorder as illustrated at 16 in FIGURE 1. This accumulating means accommodates superposition of lines having a brightness or weight varying over a relatively wide range. Further, this accumulating means provides a permanent record which is very conveniently handled and reviewed visually. A step wedge may be recorded on the photographic record element in alternation with the display of the successive lines so as to provide an accurate calibration of the recorded line densities. The input from the calibration step wedge generator indicated at 22 in FIGURE 1 is introduced to the components previously described in FIGURE 5 by means of an electronic switch 92 which may be actuated by the electronic commutator 20 at the position corresponding to output line 72 and at the $n$–1 position. A step wedge start pulse is provided as indicated at output line 73 of the commutator 20 in FIGURE 2.

The resultant photographic record produced by the illustrated apparatus may thus comprise a map of the line density at each point within a given area, and it will be understood that in general the density will vary continuously in all directions over the area.

*Summary of operation of the embodiment of FIGURE 6*

FIGURE 6 illustrates an apparatus for the generation of equal density contours from a continuous density map 200 such as produced by the apparatus of FIGURES 1 to 5. In generating equal density contours, the pulse height discriminator 210 is set at a desired value so that only points on the record 200 of greater density are reproduced in the recorder 222. The exposed record will then be transparent except at regions having densities above a predetermined value. By setting the level of the pulse height discriminator 210 at successively different values, areas within predetermined density ranges will have the same degree of transparency which will differ from the transparency of regions within a different density range.

It will be apparent that many modifications and variations may be effected without departing from the scope of the novel concepts of the present invention.

We claim as our invention:

1. Apparatus for transforming a series of units of information which are capable of being represented as configurations in a two-dimensional coordinate system into a density distribution, comprising photographic means having a photosensitive area for recording light images, radiant energy generating means disposed in operative relation to said photographic means for exposing said photosensitive area and operative to project a series of light images onto said photosensitive area, control means for receiving said series of units of information and for controlling said radiant energy generating means in accordance with said series of units of information to cause said radiant energy generating means to project a series of light images onto said photosensitive area at positions with respect to said photosensitive area corresponding to the positions of said configurations in said two-dimensional coordinate system, said photographic means recording the successive light images impinging on said photosensitive area to generate said density distribution in accordance with said series of information units, and means for supplying to said control means a series of units of information corresponding to configurations of successively different sizes and successively different orientations.

2. The apparatus of claim 1 wherein said radiant energy generating means comprises cathode ray tube means having a luminescent surface and having means for generating and deflecting a beam of electrons to produce line traces on said surface for projection as light images onto said photosensitive area, and said control means comprising means connected with said cathode ray tube means for converting said series of information units into control voltages causing said beam to produce line traces on said surface in positions with respect to said surface corresponding to the positions of said lines in said two-dimensional coordinate system.

3. In combination; storage means capable of storing information as a varying density over an area thereof; means for supplying information units to said storage means in the form of a succession of lines of variable length, direction and density; and means whereby said storage means adds the successive information units supplied thereto to provide a resultant density pattern.

4. The apparatus of claim 2 wherein said control means comprises means for varying the rate of deflection and duration of beam energization in each scan of the beam for producing a line trace on said luminescent surface of brightness in accordance with an input variable of each successive information unit.

5. In combination, display means having a display area and operative to generate traces of varying intensity between any two points within said area, means for supplying to said display means successive groups of input signals capable of being converted by said display means into a corresponding trace on said display area to produce successive traces on said display area of position and intensity in accordance with said successive groups of input signals, and recording means operatively associated with said display area for recording said successive traces, said recording means being operative to integrate the successive traces to provide an area density distribution in accordance with the total of said successive traces.

6. The combination of claim 5 wherein said display means comprises a scanning beam for generating said traces and means for controlling the point of origin and direction of scanning and rate of movement of said beam over said display area in accordance with said input signals.

7. The combination of claim 6 wherein said display means further comprises beam intensity control means for controlling the intensity of the beam and operative to shift the beam from an inoperative intensity to an operative intensity for a time period determined by input signals of the successive groups.

8. In combination, cathode ray tube means having means for establishing an electron beam and having a screen operative to emit light upon impingement on said beam thereon, said cathode ray tube means having $x$-axis and $y$-axis deflection means and $z$-axis beam intensity control means for respectively controlling deflection of said beam over the area of said screen and for shifting the intensity of said beam between an inoperative intensity and an operative intensity, means for supplying a duration control signal to said $z$-axis beam intensity control means to shift the intensity of said beam to its operative intensity for a predetermined time period, means for supplying initial position control signals to said $x$-axis and $y$-axis deflection means for determining the initial position of said beam with respect to said screen prior to shifting of the intensity of said beam to its operative intensity, means for supplying deflection control signals to said $x$-axis and $y$-axis deflection means to control the direction and rate of deflection of said beam relative to said screen, and photographic means having a photosensitive area for recording the light images produced by successive scans of said beam on said screen to generate a variable density area distribution on said photosensitive area.

9. In a method of generating a two-dimensional variable density plot of a series of information units which may be represented as lines of differing weights extending between points lying in a two-dimensional coordinate system, the steps comprising: generating initial position signals for successive lines corresponding to the coordinates of an origin point at one end of each of said lines; generating duration signals proportionate to the length of said successive lines and to the density thereof; generating deflection signals corresponding to the direction of extension of said successive lines from the respective origin points, and the rate of change of said deflection signals being inversely proportional to the weights of said successive lines; supplying said initial position signals, said duration signals and said deflection signals for the respective lines in succession to a cathode ray tube to cause the cathode ray to trace a path on the cathode ray screen corresponding to each line in succession; and recording on a photosensitive area the successive images produced by said cathode ray on the cathode ray screen to generate said variable density plot of said information units on said photosensitive area.

10. In combination; storage means capable of storing information as a variable density over an area thereof; means for supplying information units to said storage means in the form of a succession of lines of variable length and direction; and means whereby said storage means adds the successive information units supplied thereto to provide a resultant density pattern.

11. In combination; storage means capable of storing information as a variable density over an area thereof; means for supplying information units to said storage means in the form of a succession of points of variable density and of variable position with respect to said area of said storage means; and means whereby said storage means adds the successive information units supplied thereto to provide a resultant density pattern.

12. Apparatus for transforming a series of units of information which are capable of being represented as configurations in a two-dimensional coordinate system into a density distribution, comprising photographic means having a photosensitive area for recording light images, radiant energy generating means disposed in operative relation to said photographic means for exposing said photosensitive area and operative to project a series of light images onto said photosensitive area, control means for receiving said series of units of information and for controlling said radiant energy generating means in accordance with said series of units of information to cause said radiant energy generating means to project a series of light images onto said photosensitive area at positions with respect to said photosensitive area corresponding to the positions of said configurations in said two-dimensional coordinate system, said photographic means recording the successive light images impinging on said photosensitive area to generate said density distribution in accordance with said series of information units, said configurations comprising lines in said coordinate system, and means for supplying to said control means a series of units of information corresponding to successive lines of successively different lengths and of successively different origins and termination points.

13. Apparatus for transforming a series of units of information which are capable of being represented as configurations in a two-dimensional coordinate system into a density distribution, comprising photographic means having a photosensitive area for recording light images, radiant energy generating means disposed in operative relation to said photographic means for exposing said photosensitive area and operative to project a series of light images onto said photosensitive area, control means for receiving said series of units of information and for controlling said radiant energy generating means in accordance with said series of units of information to cause said radiant energy generating means to project a series of light images onto said photosensitive area at positions with respect to said photosensitive area corresponding to the positions of said configurations in said two-dimensional coordinate system, said photographic means recording the successive light images impinging on said photosensitive area to generate said density distribution in accordance with said series of information units, said configurations comprising points in said coordinate system, and means for supplying to said control means a series of units of information corresponding to a series of points in said coordinate system in respective different substantially spaced substantially non-sequential locations.

14. In combination, radiant energy recording means responsive to radiant energy of a predetermined character impinging thereon and operative to integrate the effects of successive exposures to radiant energy of said predetermined character at each elemental area thereof, radiant energy image generating means disposed in operative relation to said radiant energy recording means and having an area distribution of elemental areas for emitting radiant energy of said predetermined character to expose respective corresponding elemental areas of said recording means, electrical control means controlling energization of the respective elemental areas of said radiant energy generating means to generate radiant energy images for recording by said radiant energy recording means, said electrical control means having two separate inputs controlling energization of said elemental areas of said radiant energy generating means in accordance with respective coordinates of a coordinate system encompassing said area distribution of elemental areas, initial position control means for supplying a variable amplitude initial position signal to each of said inputs of said electrical control means for initiating energization of said radiant energy generating means at any one of a plurality of elemental areas of said area distribution in each image generating operation of said electrical control means, and input means for supplying a succession of input signals to said initial position control means to initiate energization of said area distribution of elemental areas at successvely different elemental areas and for supplying a succession of respective coordinate parameter signals to said electrical control means to produce successively different image configurations beginning at the successive different initially energized elemental areas of said radiant energy image generating means.

15. In the combination of claim 17, said input means comprising time integrating means connected to each of said inputs of said electrical control means, means coupled to said time integrating means for supplying successive time signals thereto in accordance with the dimensions of the successive images to be generated by said radiant energy image generating means, means coupled to said integrating means for supplying thereto coordinate parameter signals for each successive image to be generated in accordance with the respective contributions of the coordinates to the generation of the successive images, and said time integrating means being operative to actuate said electrical control means to generate successive images in accordance with the successive time and coordinate parameter signals supplied thereto.

References Cited in the file of this patent

UNITED STATES PATENTS

| | | |
|---|---|---|
| 2,138,577 | Gray | Nov. 29, 1938 |
| 2,843,447 | Oliver | July 15, 1958 |

UNITED STATES PATENT OFFICE
CERTIFICATE OF CORRECTION

Patent No. 2,992,293                            July 11, 1961

Scott H. Cameron et al.

It is hereby certified that error appears in the above numbered patent requiring correction and that the said Letters Patent should read as corrected below.

In the drawings, Sheets 1 to 6, lower right-hand corner, for "Harold H. Kanter", each occurrence, read -- Harold H. Kantner --; column 4, line 8, for "second" read -- secondary --; column 18, line 11, for "successvely" read -- successively --; line 17, for the claim reference numeral "17" read -- 14 --.

Signed and sealed this 10th day of October 1967.

(SEAL)
Attest:

Edward M. Fletcher, Jr.                          EDWARD J. BRENNER
Attesting Officer                                   Commissioner of Patents